Sept. 16, 1924.
T. C. BENISH
1,508,764
BRAKE ADJUSTER
Filed April 3, 1922
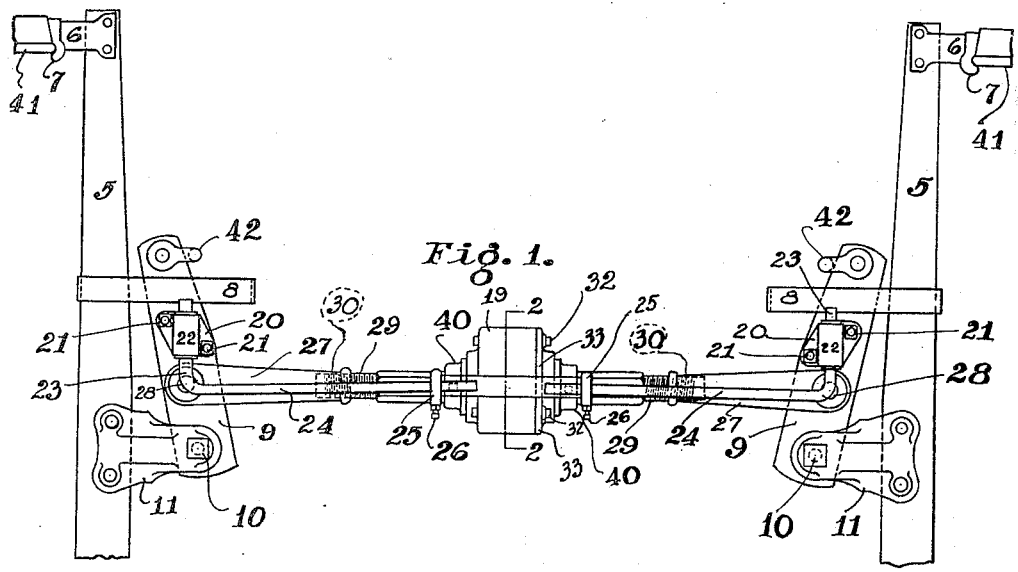
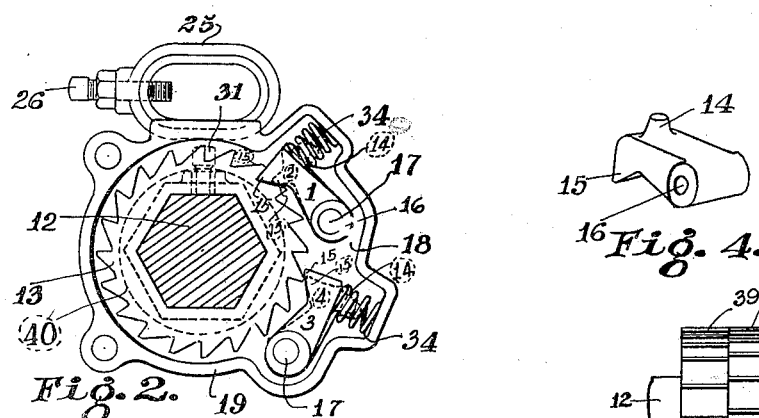
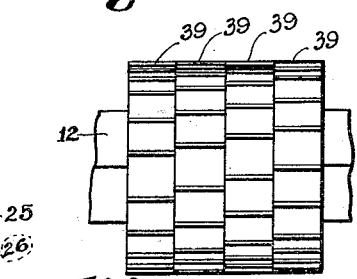
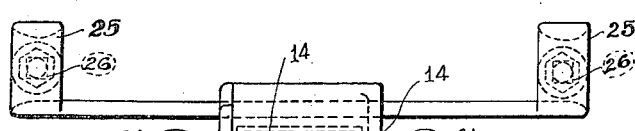
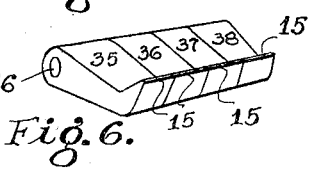
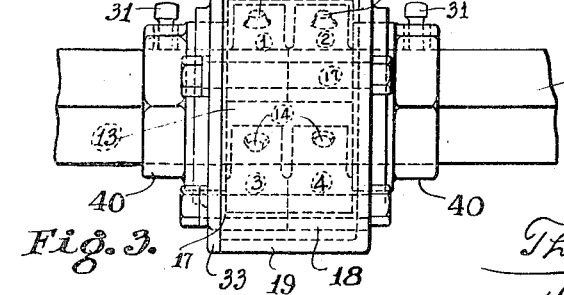

Patented Sept. 16, 1924.

1,508,764

UNITED STATES PATENT OFFICE.

THOMAS C. BENISH, OF ST. LOUIS, MISSOURI.

BRAKE ADJUSTER.

Application filed April 3, 1922. Serial No. 549,020.

*To all whom it may concern:*

Be it known that I, THOMAS C. BENISH, a citizen of the United States, residing at the city of St. Louis, in the State of Missouri, have invented certain new and useful Improvements in Brake Adjusters, of which the following is a specification.

This invention is a brake-adjuster or slack-adjuster, by which is meant a device for taking up slack in the setting of brakes for railway or other cars or locomotive engines or the like.

The especial object of this invention is to provide such a device in which the "bite" will be quicker and tighter.

Heretofore, in devices of this specific type or kind, when ratchets and pawls have been used, the objection has been observed that if the teeth of the ratchet were large enough to be adequately strong the size of the teeth was such that the device would not take hold quickly enough and that there was such space between the teeth that the set or bite was too loose. On the other hand, if the endeavor were made to cause a quicker bite and closer adjustment by making the ratchet teeth smaller they would be too weak and would readily break or shear. These objections are obviated by the present structure.

Another object of this invention is to provide a pivoted connection between the brake-lever or brake-levers and the slack-adjuster, so that the latter will be yieldingly actuated by the oscillation in the slightest degree in one direction by the live lever or levers and in the recoil will adjust the brake-mechanism to the degree of wear of the brake-shoes.

In the accompanying drawings forming part of this specification, in which like numbers of reference denote like parts wherever they occur.

Figure 1 is a top plan view;

Figure 2 is a sectional view, taken on the line 2—2 in Figure 1;

Figure 3 is a rear elevation;

Figure 4 is a detail view of one of the pawls; and Figures 5 and 6 illustrate a modification.

While in the drawings four pawls, 1, 2, 3, and 4, are shown, yet the principle of their use is the same whether there be two, three, four, or more pawls. This principle is that a pawl-and-ratchet device is provided whereby one pawl engages the ratchet quicker or sooner or with less movement than another pawl or any one of a plurality of other pawls; and this is effected either by making the pawls of different lengths or by providing teeth variously spaced on the co-operating ratchet and a plurality of pawls.

In the first-mentioned of these two constructions (which is illustrated in Figures 1 to 4, inclusive), there is but one set of ratchet teeth 13, but pawl 1 is not of the same length as pawl 3, and pawls 2 and 4 differ in length from each other and from pawls 1 and 3. The teeth 13 are wide enough that either of pawls 1 and 2, which lie side by side, and both pawls 3 and 4 (which, also, are in alinement with each other where they are pivoted) may from time to time engage teeth 13. Whichever pawl is nearest engagement with one of the teeth 13 as the ratchet is rotated bites first.

The same thing is true in the second form mentioned above (illustrated in Figures 5 and 6), in which a ratchet having a plurality of sets of teeth, the notches between which are not in alinement with each other, is adapted to receive the bite of one pawl intermediate the bite of another pawl or all the other pawls with the teeth respectively engaged thereby. In other words, if, for example, there be four pawls, and, say, pawl 35 be adapted to bite at one-eighth of an inch, pawl 36 may bite at one-fourth of an inch and pawl 37 at one-half of an inch and pawl 38 at three-fourths of an inch. These dimensions may be changed or the proportions varied in any manner that may be desired. At whatever point of adjustment the particular exigency of the application of the brake may require, slack is prevented by there being ready for an instant bite a pawl adapted to co-operate with the immediately-presented tooth 39 of a co-operating ratchet.

This device in either form is operated by the application of the braking power through the arms 42 to the brake beams 5 and arms 6 and the brakeshoes 7, acting on wheel 41. The guide-arms or supports 8 extend from the brakebeams 5 underneath and in such manner as to assist in supporting the weight of the brakelevers 9 (commonly known as live levers), which are pivoted at 10 to the castings 11, borne by the brakebeams 5. It is to be understood that while the drawings illustrate a device, herein described, fit to be used as a slack-adjuster in conjunction with a pair of brakelevers or live levers, yet, if the ordinary braking mechanism were single instead of in duplicate, this present invention can be adapted and readily used in connection therewith, as well as with such duplicate braking devices, and it can be used where only one live lever 9 is present.

The application of the braking power or air-pull to the arms 42 and thus indirectly to the brakebeams 5 causes the outer ends of levers 9 to swing inwardly on their pivots 28.

The application of braking power to levers 9 causes them to move or swing with the pivot 28 as an axis. The sleeve brackets 22 are rigidly fastened to levers 9. Arms 23 of rods 24 are in pivotal engagement therewith for vertical movement of either, but rigidly engaged for horizontal movement. Thereby arms 23 and rods 24 are caused to move back and forth with the movement of levers 9 as the braking power is applied or released.

The rods 24 are extended through collars 25, which collars 25 are provided with adjusting setscrews 26 for the purpose of adjusting the necessary free movement of rods 24 in collars 25. It will be seen that, when the braking power is applied to the levers 9, thereby pressing brakeshoes 7 through beams 5 against wheels 41, causing the brakeshoes 7 to wear with each application of the braking power, it causes levers 9 to travel past a given or predetermined point, and rods 24 likewise travel past a given or predetermined point, and rods 24 being engaged in collars 25 move the collars 25 together with housing 18 and pawls 1, 2, 3, and 4 (or pawls 35, 36, 37, and 38), which are pivotally mounted in housing 18. In this movement the shaft 12, with its righthand and lefthand threads 29, remains stationary, due to the compressional pressure exerted on the same by the braking power through levers 9, and the pawls 1, 2, 3, and 4 (or pawls 35, 36, 37, and 38) are forced to slip on the angular side of the teeth of ratchet 13, which ratchet 13 is rigidly mounted on shaft 12, but on the reverse movement of levers 9, when the braking power is released, bringing levers 9 back to the original position, the rods 24 move collars 25 with housing 18 and pawls 1, 2, 3, and 4 (or pawls 35, 36, 37, and 38) in the opposite direction, any one of these pawls now being engaged with the straight face of tooth 15 against the straight face of the tooth on ratchet 13. This turns shaft 12 with righthand and lefthand threads 29 unscrewing from sockets 30, and shaft 12 is now free to turn as the braking power is released. This movement elongates the combination of shaft 12 with the clevises 27 to the pivot points 28 to an extent that equals the amount of wear in the brakeshoes, thereby bringing brakeshoes 7 closer to wheels 41 and keeping them in the same relative position at all times. It will be noted that rods 24 projecting through collars 25 permit the elongation of shaft 12 as before described without becoming disengaged therefrom.

In Figure 4, is illustrated in detail one of the pawls 1, 2, 3, or 4, the same having the stud 14 and the usual tooth 15 and an eyelet 16 for pivoting the same by means of pin 17 to the housing 18, having a flange 19. The same description applies to pawls 35, 36, 37, and 38.

A casting 20 is attached by rivets 21 or other suitable means to each brake-lever 9, and bears a sleeve 22, in which is slidably mounted the arm 23 of connecting rod 24. Rod 24 passes adjustably through collar 25, and the movement of housing 18 is increased or decreased by the adjustment of setscrew or bolt 26. In the drawings, these parts are shown in duplicate, for a double brake or brake having two live levers 9. Clevis 27, which is pivoted at 28 to brake-lever 9, is shown in duplicate, also, for a construction having a pair of live levers. The threaded ends 29 of central shaft 12 enter threaded sockets 30 in the ends of clevises 27. Polygonal shaft 12 passes through sleeve 40 and bears ratchet 13, fixed thereto by setscrew 31. Ratchets 13 and 39 are constructed as hereinbefore described. The relation of the brake levers 9 to each other and to connecting parts can be adjusted by means of the threads 29. The interior of housing 18 can be reached by loosening bolts 32 and removing plate 33. Springs 34 press pawls 1, 2, 3, and 4 into engagement with the teeth of ratchet 13.

Set screws 31 hold sleeve 40 stationary on shaft 12, and by this means ratchet 13 is held in place and within the housing 18.

Having thus described this invention, I hereby reserve the benefit of all changes in form, arrangement, order, or use of parts, as it is evident that many minor changes may be made therein without departing from the spirit of this invention or the scope of the following claims.

I claim:

1. In a brake-adjuster the combination with a brake lever, of a shaft, a ratchet attached thereto and adapted to rotate therewith, the said ratchet having a plurality of sets of teeth arranged in staggered relation to each other, spring-pressed pawls supported in position to engage the said teeth, a connection between the said shaft and the brake lever and adjustable upon rotation of the shaft, and means for oscillating said pawls about said ratchet.

2. In a brake-adjuster, the combination with a brake live-lever, of a shaft, a ratchet attached thereto and rotatable therewith, the said ratchet having a plurality of sets of teeth arranged in staggered relation to each other and extending in the same direction, spring-pressed pawls supported in position to engage the said teeth, an adjustable connection between the said shaft and the brake lever, said connection comprising a clevis threadedly adjustable on the shaft and pivotally connected to the brake-lever, and means for oscillating said pawls about said ratchet.

3. In a brake-adjuster the combination with a brake live-lever, of a central shaft having a connection with the lever adjustable when rotated, a ratchet so attached thereto as to rotate therewith, the said ratchet having a plurality of toothed faces, the teeth of which faces are, respectively, extending in the same direction and in disalinement with each other, a plurality of pawls adapted, respectively, to engage the said respective toothed faces, the pawls being arranged to engage one of said teeth when the relative movement is less than the distance between said teeth, and a connection between said pawls and lever whereby the former are rotated in one direction when the braking power is applied and in the opposite direction when the same is released.

4. In a brake-adjuster, the combination with a brake live-lever, of a central shaft having a rotatable adjustable connection with said lever, a ratchet and a housing so mounted thereon as to rotate therewith, pawls attached to the said housing, a connection between the said brake-adjuster and the brake mechanism adapted to rotate the housing and pawls in one direction when the braking power is applied and in the opposite direction when it is released, the said ratchet having a plurality of sets of teeth and a plurality of pawls in engagement therewith, the said teeth being so arranged that one of the said pawls will engage with the teeth to which it pertains if the take-up of the brake be at one point and a different pawl engage with the teeth to which it pertains if such take-up be at a different point of adjustment less than the distance between the teeth.

5. In a brake-adjuster, the combination with a brake live-lever, of a central shaft having a connection with said lever which is adjusted when the shaft is rotated, a ratchet and a housing so mounted on the shaft to rotate therewith, pawls attached to the said housing, a connection between the said housing and the brake lever adapted to rotate the housing with pawls in one direction when the braking power is applied and in the opposite direction when it is released, the said ratchet having a plurality of sets of teeth and a plurality of pawls in engagement therewith, the said teeth of each set being so arranged that the said pawls are adapted to engage the same alternately in series and means for regulating the effective movement of the housing and pawls.

6. In a brake-adjuster, the combination with a brake live-lever, of a central shaft having a connection with said lever which is adjusted when the shaft is rotated, a ratchet and a housing so mounted on the shaft to rotate therewith, pawls attached to the said housing, a connection between the said brake adjuster and the brake lever adapted to rotate the housing and pawls in one direction when the braking power is applied and in the opposite or take-up direction when it is released, the said ratchet having a plurality of sets of variedly spaced teeth and a plurality of pawls in engagement therewith, the said teeth of each set being so arranged that the said pawls are adapted to engage the same alternately in series, the first one engaged depending upon the take-up of the brake.

7. A brake-adjuster, in combination with a brake-lever comprising a central shaft adjustably connected to the brake lever, a body loosely mounted thereon for rotation, a plurality of pawls borne by said body, a ratchet mounted on the said shaft to rotate therewith to effect said adjustment, said pawls being arranged so that one will effectively engage said ratchet when the relative movement is less than the distance between its teeth, a rod extending from the said body to the brake lever, and a pivotal connection between the said rod and the brake-lever.

8. A brake-adjuster, in combination with a brake-lever comprising a central shaft adjustably connected to the brake-lever, a body loosely mounted thereon for rotation, a pawl borne by said body, a ratchet mounted on the said shaft to rotate therewith to effect said adjustment, a rod extending from the said body to the brake-lever, and a vertically pivotal connection between the said rod and the brake-lever, which connection is horizontally rigid.

9. A brake-adjuster, in combination with a brake-lever, comprising a central shaft adjustably connected to the brake lever, a body loosely mounted thereon for rotation, a plurality of pawls borne by said body, a ratchet mounted on the said shaft to rotate therewith to effect said adjustment, a rod extending from the said body to the brake-lever, the said rod being attached to the said body to cause them to rotate together but slidably attached thereto transversely of the axis of the said rotation, and a connection between the said rod and the brake-lever pivotal in its nature in one direction and rigid in a plane transverse thereto.

10. A brake-adjuster, in combination with a brake-lever comprising a central shaft, a body loosely mounted thereon for rotation, a pawl borne by said body, a ratchet mounted on the said shaft to rotate therewith, a rod extending from the said body to the brake-lever, a clevis, a threaded connection between the said shaft and the said clevis and adjustable upon rotation of said shaft, a pivotal connection between the said clevis and the brake-lever, and a compound connection between the said rod and the said brake-lever pivotal in one direction and rigid transversely thereto.

11. A brake-adjuster, in combination with a brake lever, comprising a central shaft, a body loosely mounted thereon for rotation, a pawl borne by said body, a ratchet mounted on the said shaft to rotate therewith, a rod extending from the said body to the brake-lever, a clevis, a threaded connection between the said shaft and the said clevis and adjustable upon rotation of said shaft, a pivotal connection between the said clevis and the brake-lever, and a compound connection between the said rod and the said brake-lever pivotal in a direction transverse to the axis of said lever and rigid in the direction of movement of said lever, and a connection between the said body and the said rod rigid in a direction transverse to the axis of the body and slidably adjustable in the direction of movement of the body.

12. A brake-adjuster, in combination with a brake lever, comprising a central shaft, a body loosely mounted thereon for rotation, a pawl borne by said body, a ratchet mounted on the said shaft to rotate therewith, a rod extending from the said body to the brake-lever, a clevis, a threaded connection between the said shaft and the said clevis and adjustable upon rotation of said shaft, a pivotal connection between the said clevis and the brake-lever, and a vertically pivotal connection between the said rod and the said brake-lever and rigid horizontally, and a connection between the said body and the said rod rigid in a vertical direction and slidably adjustable horizontally, the threaded connection between the shaft and the clevis being adapted to adjust the set of the brakeshoe, and the slidable adjustment between said rod and body regulating the degree of movement of the body.

In testimony whereof I hereunto affix my signature.

THOMAS C. BENISH.